United States Patent
Postadan

[11] Patent Number: 5,803,692
[45] Date of Patent: Sep. 8, 1998

[54] PUSHNUT FOR USE IN CONJUNCTION WITH A CYLINDRICAL SHAFT HAVING A PAIR OF OPPOSED FLAT SURFACES

[75] Inventor: Reynaldo M. Postadan, Jersey City, N.J.

[73] Assignee: Trans Technology Corp., Liberty Corner, N.J.

[21] Appl. No.: 652,092

[22] Filed: May 23, 1996

[51] Int. Cl.⁶ .................................................. F16B 21/18
[52] U.S. Cl. ........................................... 411/526; 411/520
[58] Field of Search ............................ 411/353, 520, 411/525, 526, 527

[56] References Cited

U.S. PATENT DOCUMENTS

| | | |
|---|---|---|
| 312,943 | 2/1885 | Winans . |
| 2,236,929 | 4/1941 | Tinnerman . |
| 2,342,910 | 2/1944 | Tinnerman . |
| 2,382,521 | 8/1945 | Tinnerman .................. 411/527 |
| 2,581,288 | 1/1952 | Pletcher ..................... 411/520 |
| 2,837,955 | 6/1958 | Sislik et al. . |
| 2,969,705 | 1/1961 | Becker . |
| 2,986,059 | 5/1961 | Duffy et al. . |
| 4,664,465 | 5/1987 | Johnson ...................... 411/527 |
| 4,784,418 | 11/1988 | Pearson ...................... 411/525 |
| 4,911,594 | 3/1990 | Fisher . |
| 5,195,860 | 3/1993 | Steyn ......................... 411/526 |

FOREIGN PATENT DOCUMENTS

| | | | |
|---|---|---|---|
| 821706 | 10/1959 | United Kingdom | ........... 411/520 |

*Primary Examiner*—Flemming Saether
*Attorney, Agent, or Firm*—Wall Marjama & Bilinski

[57] ABSTRACT

A pushnut fastener for use in conjunction with a cylindrical shaft having a pair of opposed flat surfaces extending therealong. The pushnut has an opening that complements the shape of the shaft and includes arcuate blades that are, in assembly, biased in contact with the arcuate surfaces of the shaft and straight blades that are biased in contact with the flat surfaces of the shaft. In a relaxed condition, the straight blades are generally parallel with the horizontally disposed base of the nut and the arcuate shaped blades are set at an angle of about 45° with the base.

12 Claims, 1 Drawing Sheet

PUSHNUT FOR USE IN CONJUNCTION WITH A CYLINDRICAL SHAFT HAVING A PAIR OF OPPOSED FLAT SURFACES

BACKGROUND OF THE INVENTION

This invention relates to a pushnut fastener and, in particular, to a pushnut fastener suitable for mounting upon a cylindrical stud containing a pair of opposed parallel flat surfaces extending along the length of the stud.

Pushnut fasteners formed of sheet metal are well known and widely used in the art. This type of fastener is a highly reliable and relatively inexpensive device that is used to replace different types of threaded fasteners in many applications. The pushnut fastener has found wide spread use in the automotive industry, particularly in difficult to reach places that are relatively inaccessible to conventional threaded fastener tools.

Typically, the pushnut fastener is used in association with an unthreaded cylindrical stud as disclosed in U.S. Pat. No. 4,911,594. The pushnut generally has a cylindrical opening for receiving the stud about which a series of circumferentially spaced teeth are positioned. Many different types of tooth forms have been developed which permit the stud to be passed into the nut at a first relatively low push force but exert a high holding strength against the stud that prevents the stud from pulling out of the nut.

Some fastener applications require that a nut be mounted on a cylindrical stud or shaft having a pair of opposed parallelly aligned flat surfaces extending axially therealong. The flats typically serve to prevent the stud from turning in a complementary receiving hole. It has been found, however, that a typical pushnut having a circular stud receiving opening will not deliver the necessary pre-load stress or holding strength against a stud having flats. As a result, the stud tends to pull out of the nut when placed under load.

SUMMARY OF THE INVENTION

It is an object of the present invention to improve pushnut fasteners.

It is a further object of the present invention to improve the pre-load stress and holding force of a pushnut against a stud or a shaft having flat surfaces thereon.

It is a still further object of the present invention to provide a pushnut for use in conjunction with a cylindrical shaft or stud having opposed parallel flat surfaces thereon.

It is yet another object of the present invention to provide a pushnut that is fabricated from a sheet metal that is capable of delivering a high holding force against both the flat and circular sections of the shaft or stud having flats machined or otherwise formed thereon.

Yet another object of the present invention is to provide a pushnut that complements the shape of a shaft or stud having opposed flats thereon having a specially profiled tooth forms for separately engaging the circular and flat surfaces on the shaft or the stud.

These and other objects of the present invention are attained by means of a pushnut fastener for engaging a cylindrical shaft or stud having opposed parallel surfaces thereon. The pushnut is fabricated from a single piece of sheet metal and includes a cup-shaped member having a horizontally disposed rim and a raised center section having a flat top that is parallel with the rim. An opening is provided in the top surface of the member that complements the cross-sectional shape of the shaft or stud intended to be received therein. The opening contains a pair of opposed parallel side walls and a pair of opposed arcuate end walls. A cutout is located at each corner of the opening between the walls to establish a straight elongated blade along each of the side walls and an arcuate shaped blade along each of the end walls. The arcuate shaped blades are turned downwardly at about a 45° angle with the rim and the straight blades remain parallelly aligned with the rim. The opening described by the blades is such that the blades are deformed by the shaft or shank as it passes through the opening so as to exert a spring holding force against both the circular and flat surfaces thereon.

BRIEF DESCRIPTION OF THE DRAWINGS

For a better understanding of these and other objects of the present invention, reference shall be made to the following detailed description of the invention which is to be read in association with the accompanying drawings, wherein.

DESCRIPTION OF THE INVENTION

The pushnut of the present invention is ideally suited for use in conjunction with a cylindrical shaft or stud having opposed parallel flats machined or otherwise formed axially therealong. As noted above, a conventional pushnut having a circular stud receiving opening cannot deliver the high holding forces against this type of stud required to secure the stud in assembly. As will be noted in greater detail below, the present pushnut is provided with teeth in the form of blades that are capable of acting on both the circular and flat sections of a shaft or stud to deliver a maximum holding force against the stud.

Figure 1:
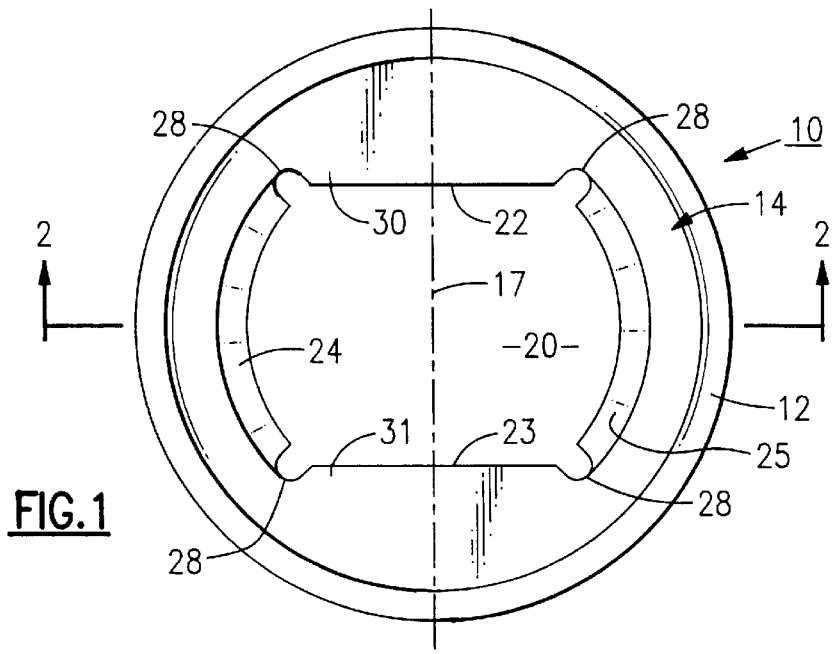
FIG. 1 is a top plan view of a pushnut fastener embodying the teachings of the present invention.
Figure 2:
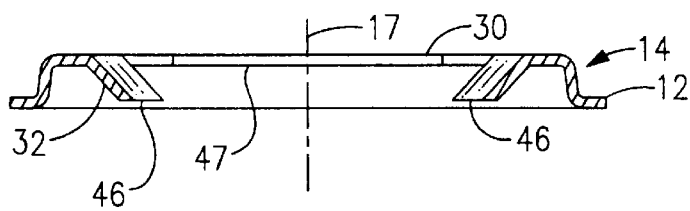
FIG. 2 is a sectional view taken along line 2—2 in FIG. 2.

As illustrated in FIGS. 1 and 2, the present pushnut 10 is stamped or otherwise formed from a piece of sheet metal which is preferably spring steel. The device is basically cup-shaped and circular in form and includes an annular horizontally disposed rim 12 that forms a base for the device. A cylindrical center section 14 is raised to a given height above the rim. The center section has a top wall 15 that is generally parallel to the rim. The rim and the center section of the nut both share a common vertical axis 17.

An opening generally referenced 20 is formed in the top wall 15 of the center section with the opening symmetrically arranged about the vertical axis of the nut. The opening is arranged to receive a shaft or stud having a similar, yet slightly larger cross sectional shape. The opening in the nut contains a pair of opposed parallelly aligned side walls 22 and 23 and a pair of circular end walls 24 and 25. The four walls of the opening come together to create four diagonally opposed corners. A radially extended slot or cutout 28 is located at each corner so as to establish a pair of straight blades 30 and 31 along the two straight side walls of the opening and a pair of arcuate-shaped blades 32 and 33 along the circular walls of the opening. The arcuate-shaped blades are turned downwardly to form an angle of about 45° with the base or rim of the pushnut.

The blades, in practice, are spring members that are deflected downwardly toward the rim of the nut when a shaft or stud of proper size is passed downwardly through the opening in the top wall of the nut. Preferably, the space between the blades is about 0.020 less than a comparable distance on the shaft or stud. For example, when using a 0.750" diameter stud having a normal distance across the flats of 0.55", the space across the opening between arcuate-shaped blades should preferably be about 0.730" and the space across the opening between the straight blades should preferably be about 0.530" for a pushnut formed of 105° spring steel having a thickness of about 0.017". When applied to a steel shaft or stud having a hardness that is slightly less than that of the nut, the push on force required to seat the nut will be about 275 pounds maximum. It has been found that under these conditions the blades of the pushnut will produce a sufficient holding force of 1000 pounds minimum against the receiving shaft.

Figure 3:
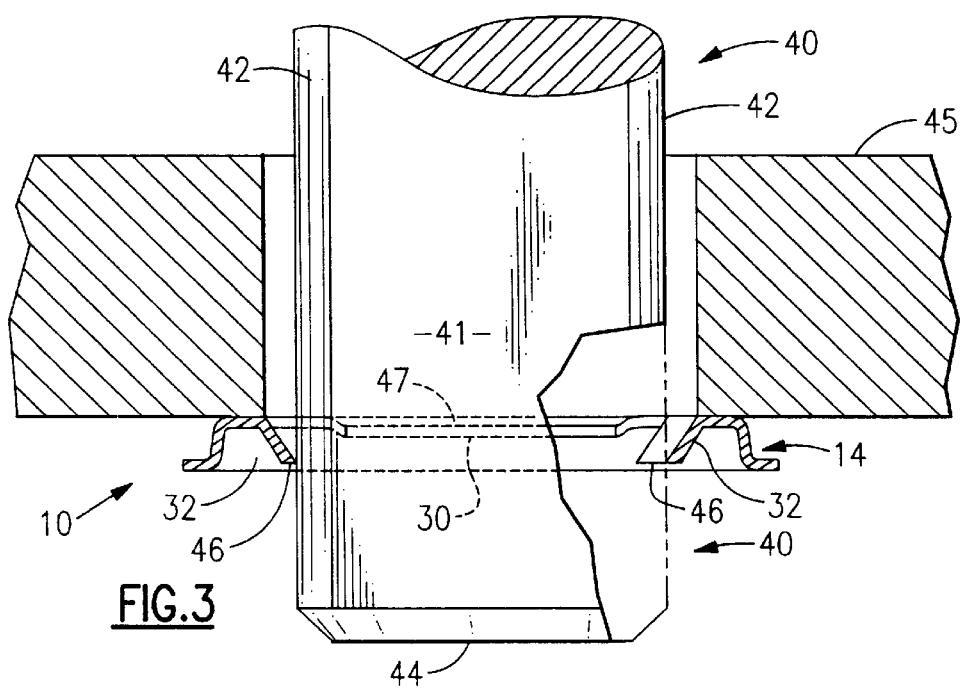
FIG. 3 is an enlarged side elevation in section showing the pushnut of the present invention mounted upon a receiving shaft or stud.

Turning now to FIG. 3, there is shown an enlarged side elevation of the present pushnut mounted upon a shaft 40 having two opposed flat surfaces 41 and two opposed circular surfaces 42 extending axially along the shaft. In this case, the shaft is the steering column of a motor vehicle that is passed through a clearance hole in mounting bracket 45. A pushnut 10, as described above, is passed downwardly over the distal end of the shaft and seated, as illustrated against the mounting bracket. Because the opening in the nut provides an interference fit in regard to the shaft, both the straight blades and the arcuate-shaped blades, acting as spring elements, are deformed toward the distal end 44 of the shaft. The edges 46–47 of the blades facing the distal end of the shaft are roughened to create burrs therealong to enhance the ability to grip the shaft. The deformed blades thus act as beams in compression to resist the movement of the nut along the shaft. Accordingly, if one of the nuts is locked in position against the bracket, the blades will be in maximum holding contact against the shaft rendering the pushnut stationary against the shaft to provide high pre-load stresses and holding strength.

While this invention has been explained with reference to the structure disclosed herein, it is not confined to the details set forth and this invention is intended to cover any modifications and changes as may come within the scope of the following claims:

What is claimed is:

1. A pushnut fastener for engaging a cylindrical shaft or stud having a pair of parallel opposed flat surfaces, said pushnut including, a sheet metal cup-shaped member having a flat horizontally disposed rim and a raised center section having a top surface that is parallel with said rim, said rim and center section being coaxially aligned about a vertical axis, said raised section of said member having a stud receiving opening that is symmetrical about said vertical axis, said opening having a pair of parallel opposed side walls and a pair of arcuate end walls, each end wall having a radius centered upon said vertical axis, said end walls and side walls forming corners to establish an elongated straight blade along each of said side walls and an arcuate shaped blade along each of said end walls, whereby the blades are deformable by a shaft or stud passing downwardly through said opening, a radially extended cutout at each of said corners, and each of said arcuate shaped blades being turned inwardly toward said rim of said members at an angle of about 45° with said rim.

2. The pushnut of claim 1 wherein the projection of the arcuate-shaped blades along the vertical axis is less than the vertical height of said center section of said member above the rim.

3. The pushnut of claim 1 wherein said pushnut is formed of spring steel.

4. The pushnut of claim 1 wherein each blade has an edge portion facing the rim, said edge portion being roughened to form burrs therealong.

5. The pushnut of claim 1 wherein said pushnut possesses a holding strength that is about 3.5 to 3.75 the force required to push the nut upon a shaft or a stud.

6. The pushnut of claim 1 wherein the member has an annular rim and a circular center section.

7. A pushnut fastener unit that includes a stud having an elongated cylindrical shank and a pair of parallel opposed flats extending axially along the shank, a cup-shaped sheet metal pushnut having a flat horizontally disposed rim and a raised center section having a top surface that is parallel with said rim, said rim and said center section being coaxially aligned about a vertical axis, said raised section of said member having a stud receiving opening that is symmetrically centered about the vertical axis of said pushnut, said opening having a pair of parallelly opposed side walls and a pair of arcuate end walls, each end wall having a radius that is centered upon said vertical axis, said end walls and said side walls forming corners and an arcuate-shaped blade along each of the end walls, a radially extended cutout at each of said corners, and each of said arcuate-shaped blade being turned inwardly toward said rim at an angle of about 45° with said rim, the edge distance between the arcuate shaped blades being less than the diameter of the stud and the edge distance between the straight blades being less than the distance between the flats contained in said stud whereby the blades are forced into biasing contact with the wall surfaces of the stud as it is passed downwardly through said opening.

8. The fastener unit of claim 7 whereby said sheet metal pushnut is formed of spring steel having a given hardness and the stud is formed of a material having a hardness less than that of said pushnut.

9. The fastener unit of claim 7 wherein a projection of said arcuate-shaped blade along the vertical axis is less than the vertical wall of the center section above said rim.

10. The fastener unit of claim 7 wherein each blade has an edge portion facing said rim, said edge portion being roughened to form burrs therealong.

11. The fastener unit of claim 7 wherein said pushnut possesses a holding strength that is between 3.5 and 3.75 the force required to push the nut on said shaft.

12. The fastener of claim 7 wherein the rim of said pushnut is annular and the center section is cylindrical.

* * * * *